United States Patent
Kuehlwein et al.

(10) Patent No.: US 7,190,541 B2
(45) Date of Patent: Mar. 13, 2007

(54) HI-SPEED PREAMPLIFIER WRITE DRIVER FOR HARD DRIVE WITH IMPROVED SYMMETRY

(75) Inventors: Jeremy Kuehlwein, Woodbury, MN (US); Scott Sorenson, Lakeville, MN (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/375,513

(22) Filed: Mar. 14, 2006

(65) Prior Publication Data

US 2006/0171054 A1   Aug. 3, 2006

Related U.S. Application Data

(62) Division of application No. 10/749,088, filed on Dec. 30, 2003, now Pat. No. 7,068,454.

(51) Int. Cl.
*G11B 5/02* (2006.01)
*G11B 5/09* (2006.01)
*H03B 1/00* (2006.01)

(52) U.S. Cl. .......................................... 360/67; 360/46
(58) Field of Classification Search .................... None
See application file for complete search history.

*Primary Examiner*—Andrea Wellington
*Assistant Examiner*—Jason Olson
(74) *Attorney, Agent, or Firm*—J. Dennis Moore; W. James Brady; Frederick J. Telecky, Jr.

(57) ABSTRACT

A write driver (38) produces balanced voltages across head (32) by using the input write data (WDX and WDY) drive transistors of a slower transistor type (typically PNP) on one half of an H-bridge configuration, while transistors of a faster transistor type (typically NPN) in the other half of the H-bridge configuration are driven indirectly by transistors of the slower type, with a trans-resistance in series with transistors of the faster type. Accordingly, the voltage nodes on either side of the write head are pulled to Vcc and Vee symmetrically. A trans-resistance block (40) uses current sources to pull current from capacitive nodes for faster switching.

3 Claims, 7 Drawing Sheets

HI-SPEED PREAMPLIFIER WRITE DRIVER FOR HARD DRIVE WITH IMPROVED SYMMETRY

CROSS-REFERENCE TO RELATED APPLICATIONS

This application claims priority under 35 USC § 120 of application Ser. No. 10/749,088, filed Dec. 30, 2003 now U.S. Pat. No. 7,068,454. This application is a divisional of the above mentioned application.

Not Applicable

STATEMENT OF FEDERALLY SPONSORED RESEARCH OR DEVELOPMENT

Not Applicable

BACKGROUND OF THE INVENTION

1. Technical Field

This invention relates in general to disk storage devices and, more particularly, to a high speed preamplifier/write driver.

2. Description of the Related Art

Almost all business and home computers use a hard disk drive storage system for mass storage requirements. A hard disk drive stores data by individually modifying the magnetic orientation of small regions of a disk surface. As shown in FIG. 1, a hard disk drive 10 typically includes one or more rotating disks 12. A head assembly 14 associated with each surface of the disks 12 typically includes separate read and write heads for reading data from the disk and writing data to the disk. The write head is essentially a small coil of wire which stores data by magnetizing small regions along a disk's tracks. A current driven through the write head in a first direction magnetizes a small region of the disk under the head at a first orientation and a current driven through the write head in the opposite direction magnetizes a small region of the disk under the head at a second orientation. The read head distinguishes the magnetic orientation of each bit location to derive logical "1s" and "0s".

The circuit which drives the write head is referred to as a "write driver", which is part of the read/write preamplifier 16. The write driver controls the direction of the flow of current through the head, responsive to information from the channel circuitry 18. The channel circuitry receives data from the hard drive controller 20 of the computer 22.

A recent requirement from disk drive manufacturers is that the preamplifier write driver provides a symmetric write driver signal for reduced noise coupling. A symmetric write driver must have equal and opposite positive and negative write driver signals over all frequency data patterns. These write driver signals must be symmetric in amplitude as well as transient behavior. If the positive and negative write driver signals are well matched in amplitude and transient behavior, the write driver will have virtually no common-mode signal component. The requirement of a symmetrical write driver is driven by read head reliability as the new generation of magneto-resistive (MR) heads is much more sensitive to capacitive coupling from the write driver. Non-symmetrical write drivers with large common-mode voltage components can capacitively couple damaging voltage levels, both differentially and single-ended, to the read head. Generally symmetrical write drivers have been developed to address this problem.

Write drivers drive the write head differentially to achieve the maximum voltage possible across the write head for both positive and negative transitions. The requirement of driving the write head differentially means that both sides of the write driver must have bi-directional drive capability.

FIG. 2 illustrates an example of a typical prior art write driver 30 using an H-bridge configuration. WDX and WDY are the differential data signals for driving a current through head 32 in a desired direction. If WDX is at a higher potential than WDY, then NPN transistors Q0L and Q2L will conduct, while NPN transistors Q0R and Q2R will not conduct. Q2L will lower the voltage at the base of Q1L through the trans-resistance block (which may be as simple as a resistor), causing Q1L to not conduct. With Q2R not conducting, the base of Q1R will be pulled to near Vcc, causing it to conduct as well. Accordingly, a current path is established from Vcc to Vee (as shown by the dotted line) through Q1R, head 32, Q0L and R1. Additionally, Q2L will lower the voltage at the base of PNP transistor Q3R through block trans-resistance block, causing Q3R to conduct as well. The current through head 32 will equal the sum of the current through Q3R and Q1R.

Similarly, if WDY is at higher potential than WDX, current will flow in through head 32 in the opposite direction as the current path will flow through Q3L and Q1L, head 32, Q0R and R1.

The PNP transistors Q3L and Q3R perform an important function of providing a larger current path through head 32 through improved top-side drive capability. Unfortunately, since most IC processes do not have true complimentary active devices, from a switching speed perspective, write drivers of the type shown in FIG. 2 are unbalanced, due to the PNP transistor being slower than the NPN transistor for most processes (in some processes, the PNP are faster than the NPN). For fast switching, circuit designers design the circuit such that the transistors with the faster technology (usually the NPN) are directly driven by the differential data signals (WDX and WDY). For ease of illustration in the remainder of the specification, it will be assumed that NPN will be the faster of the two device technologies.

The problem with unbalanced write drivers is shown in the graph of FIG. 3. FIG. 3 illustrates the voltage at nodes HWX and HWY as current switches direction through head 32. At steady-state, there is a relatively low voltage across head 32. However, when the direction of current through head 32 switches, Q0L or Q0R will pull one side of the head 32 towards Vee and transistors Q1L or Q1R along with Q3L or Q3R will pull the other side towards Vcc. Using the example where WDX>WDY, Q0L will rapidly pull HWX low, because of the superior speed of the NPN transistor, while the slower speed of PNP transistor Q3R and the RC time constant in series with the data path through Q1R pull HWY high at a slower rate. This design has an inherent asymmetry. As a result, the common mode voltage (the average of the voltages at HWX and HWY) across the head fluctuates rapidly (see FIG. 10), which capacitively couples to the read head and can cause damage to the read head.

Accordingly, a need has arisen for a balance write driver with very low common-mode components.

BRIEF SUMMARY OF THE INVENTION

In the present invention, a hard disk storage system comprises a magnetic disk, a head for writing data to the disk, and a preamplifier for orienting a current through the head in a desired direction responsive to a data signal. The preamplifier includes a first pair of transistors of a first type driven by the data signal coupled to across the head and a second pair of transistors of a second type coupled across the head and driven by a transistor of the first type, such the first and second pairs of transistors provide a current path through the head in a direction responsive to the data signal. The first transistor type is chosen as the slower of the two transistor types, so that one terminal of the head is pulled to a first voltage level through one of the first pair of transistors and another terminal of the head is pulled to a second voltage level through the second transistor at substantially the same time.

The present invention provides significant advantages over the prior art. Because the voltages on either side of the head are drawn towards equal and opposite voltage levels at substantially the same time, the common mode voltage across the write head remains near ground at all times.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 4–10 of the drawings, like numerals being used for like elements of the various drawings.

Figure 1:
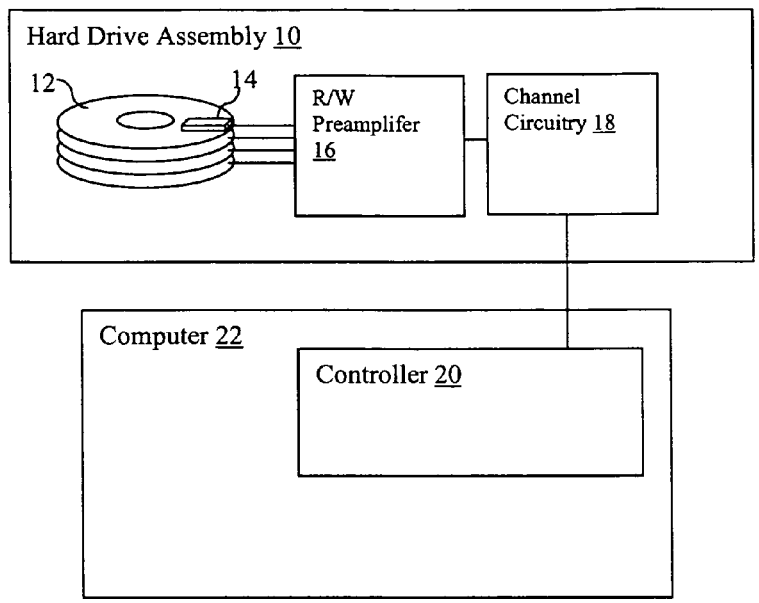
FIG. 1 illustrates a hard drive system coupled to a computer.
Figure 2:
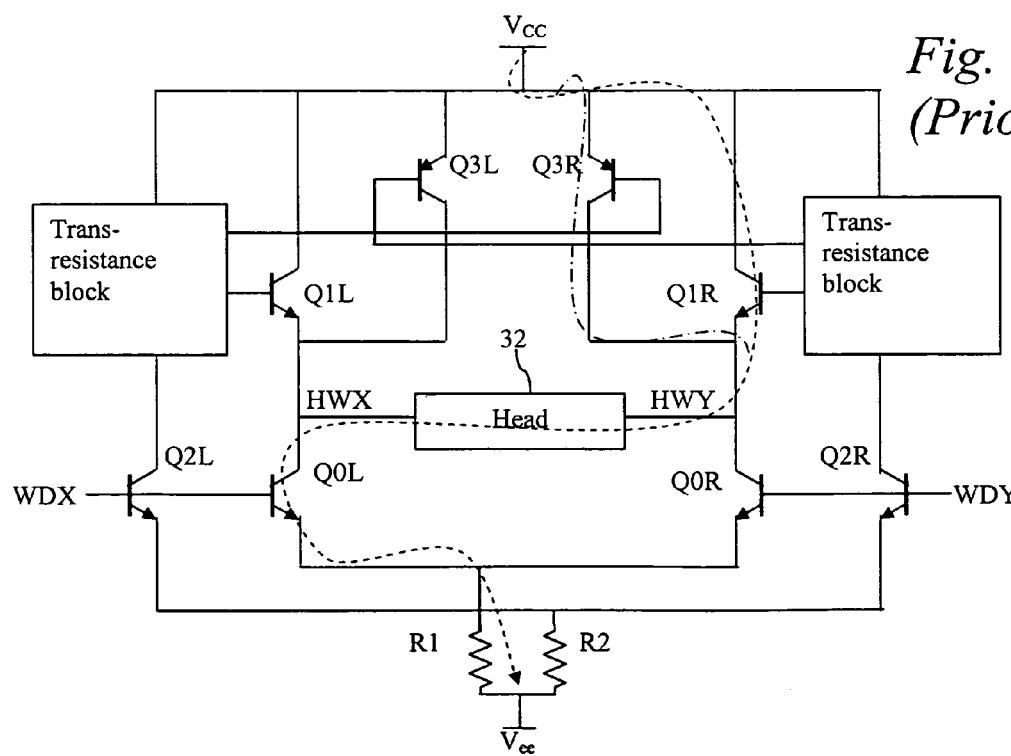
FIG. 2 illustrates a prior art write driver used in the preamplifier of the hard drive system of FIG. 1.
Figure 3:
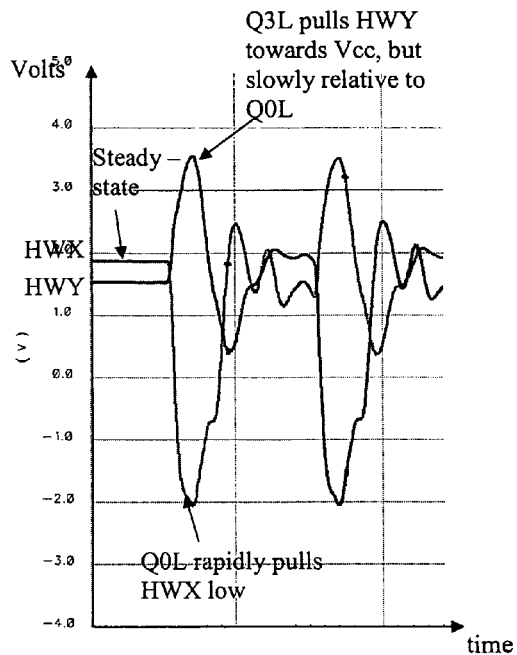
FIG. 3 illustrates typical voltages produced by the write driver of FIG. 2 across a write head.
Figure 4:
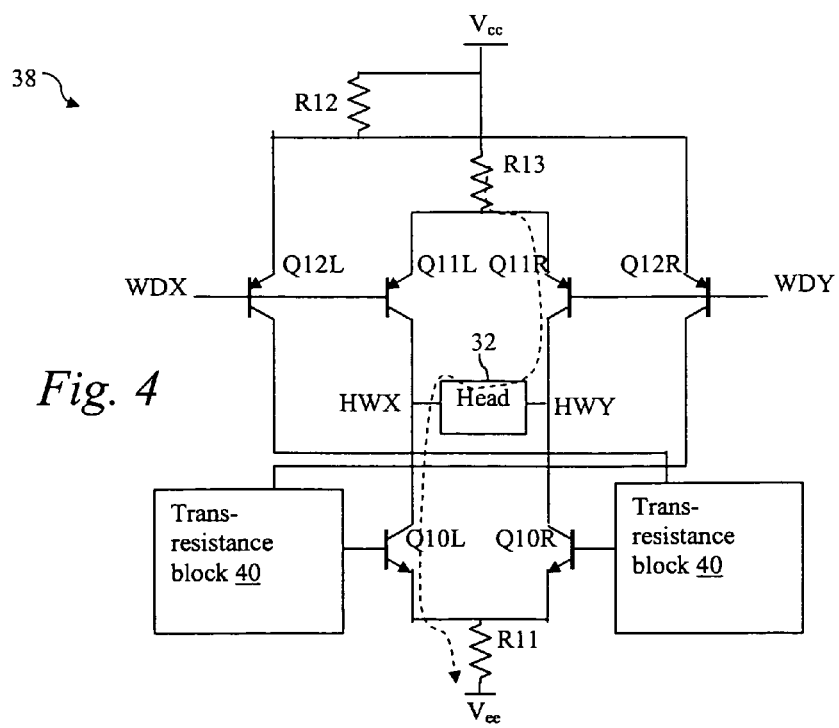
FIG. 4 illustrates an improved write driver.

FIG. 4 illustrates a preferred embodiment of a write driver 38 which provides vastly improved common mode characteristics. WDX drives the bases of PNP transistors Q12L and Q11L and WDY drives the bases of PNP transistors Q12R and Q11R. The emitters of Q12L and Q12R are coupled to Vcc through resistor R12. The emitters of Q11L and Q11R are coupled to Vcc through resistor R13. The collector of Q12L is coupled to the base of Q10R through the trans-resistance block 40 (described in greater detail below), the collector of Q11L is coupled to HWX and to the collector of NPN transistor Q10L, the collector of Q11R is coupled to HWY and to the collector of NPN transistor Q10R, and the collector of Q12R is coupled to the base of Q10L through the trans-resistance block 40. Head 32 is coupled between the nodes HWX and HWY.

In operation (using the example of the potential at WDX being greater than the potential at WDY), PNP transistors Q12L and Q11L will turn off and PNP transistors Q12R and Q11R will turn on. With Q12L turned off, the base of NPN transistor Q10R will be pulled towards Vee, turning Q10R off. With Q12R on and the base of Q10L pulled up relative to the base of Q10R (thus turning on Q10L), a current path to Vee is created from Vcc, through R13, Q11R, head 32, Q10L and R11.

Unlike the prior art, however, the slower devices, the PNP transistors, are driven by the differential data signals at WDX and WDY. Accordingly, one of the PNP transistors Q11L or Q11R will begin to conduct at about the same time as the NPN transistor Q10R or Q11L on the opposite side of the write driver, producing a symmetrical signal between HWX and HWY.

It is important that the current amplifier used to implement trans-resistance block 40 be designed to be faster than the driving PNP devices Q12L and Q12R, such that the associated NPN devices are enabled at the same time as the PNP devices. Current day current amplifiers would not be suitable to achieve such a task at data rates of over 2 Gbits/sec, due to inherent speed limitations. An improved trans-resistance block is described in connection with FIGS. 5–8.

Figure 5:
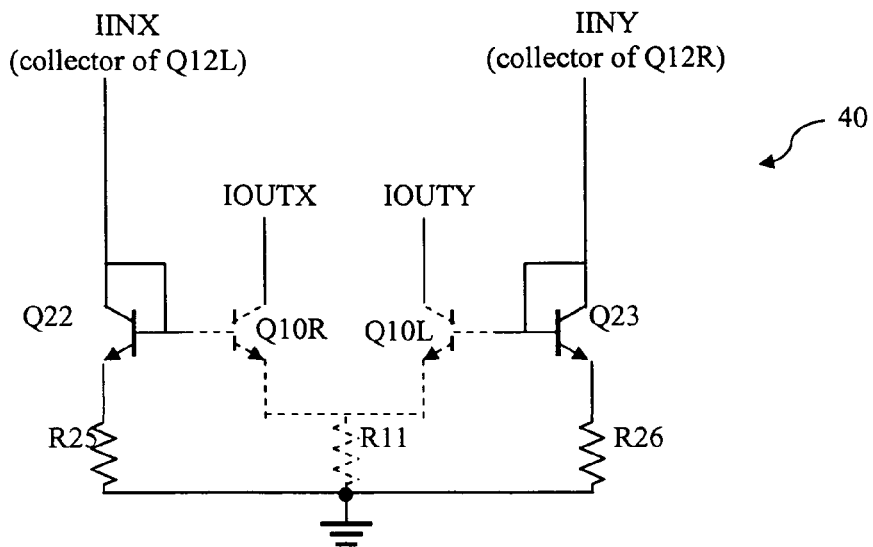
FIG. 5 illustrates a first prior art trans-resistance circuit.
Figure 6:
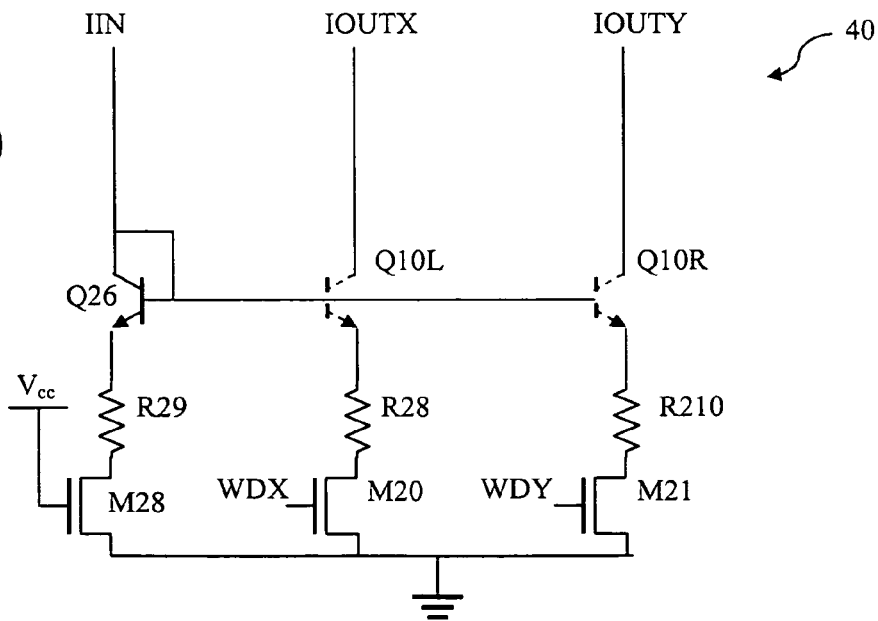
FIG. 6 illustrates a second prior art trans-resistance circuit.

FIGS. 5 and 6 illustrate prior art current amplifiers for implementing the trans-resistance block 40. In FIG. 5 (with portions of write driver 38 shown in phantom), NPN transistors Q22 and Q23 have collectors coupled to Q12L and Q12R, respectively, from FIG. 4. The emitters of transistors Q22 and Q23 are coupled to ground through resistors R25 and R26, respectively. Transistor Q22 forms a current mirror with Q10L of the write driver 38 and Q23 forms a current mirror with Q10R of write driver 38.

In operation, input currents IINX and IINY are switched by the write data (WDX and WDY), such that only one input receives current at any given time. If Q22 receives current, the current is mirrored through Q10L. Similarly, if Q23 receives current, the current is mirrored through Q10R.

This implementation has two drawbacks that limit the speed. First, when the input current IINX (or IINY) is off, the input device Q22 (or Q23) gets shut off completely, thus causing a slow turn-on upon a switch. Secondly, the turn-off is slow because when the input current IINX (or IINY) turns off, the base of the output device Q10L (or Q10R) decays slowly with the natural RC response associated with R25 and emitter resistance of Q22 (or R26 and the emitter resistance of Q23) and the parasitic capacitance at that node.

FIG. 6 illustrates a prior art embodiment where MOS devices are controlled by the differential write data to selectively pass current through Q10L or Q10R. In this embodiment, a current path though Q26 and MOS transistor M28 is always on. Depending upon whether the WDX signal or the WDY signal is high, Q26 will form a current mirror with either Q10L or Q10R.

This implementation also has two drawbacks. First, the write data WDX and WDY must swing at full CMOS levels, which takes a lot more time compared to the couple hundred millivolts required to switch a bipolar differential pair. Secondly, most write drivers utilize +5 v, −5 v supplies. Since the topside drive is near +5 v and the bottomside drive is near −5 v, the same write data CMOS signals cannot be used to drive both topside and bottomside due to CMOS breakdown issues. It is very difficult to accurately synchronize separate topside and bottomside write data signals at high data rates. It is not expected that this embodiment can exceed 1.5 Gbit/sec switching speeds, which is not fast enough for the current technology.

Figure 7:
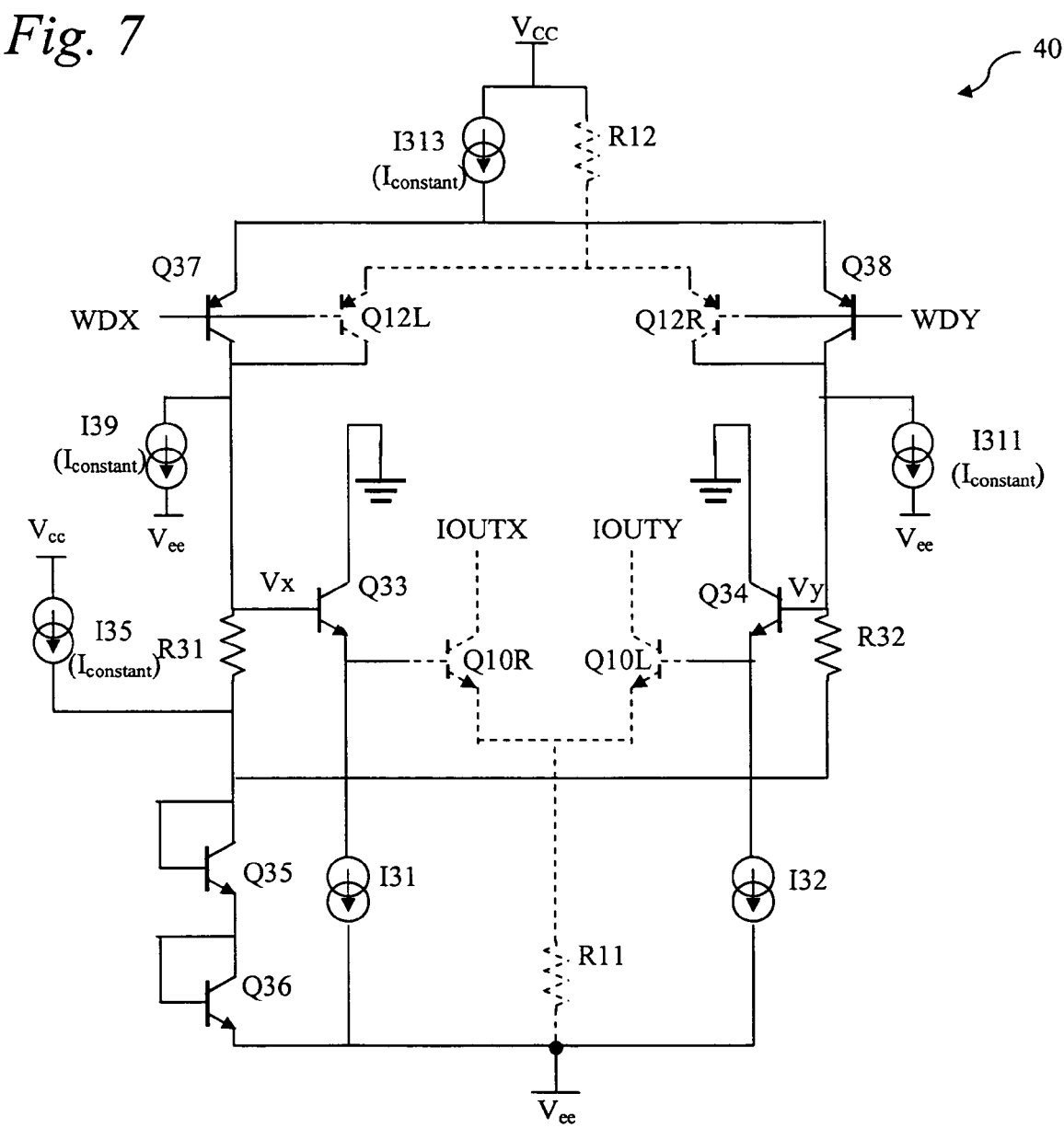
FIG. 7 illustrates an improved trans-resistance circuit used in the write driver of FIG. 4.
Figure 8:
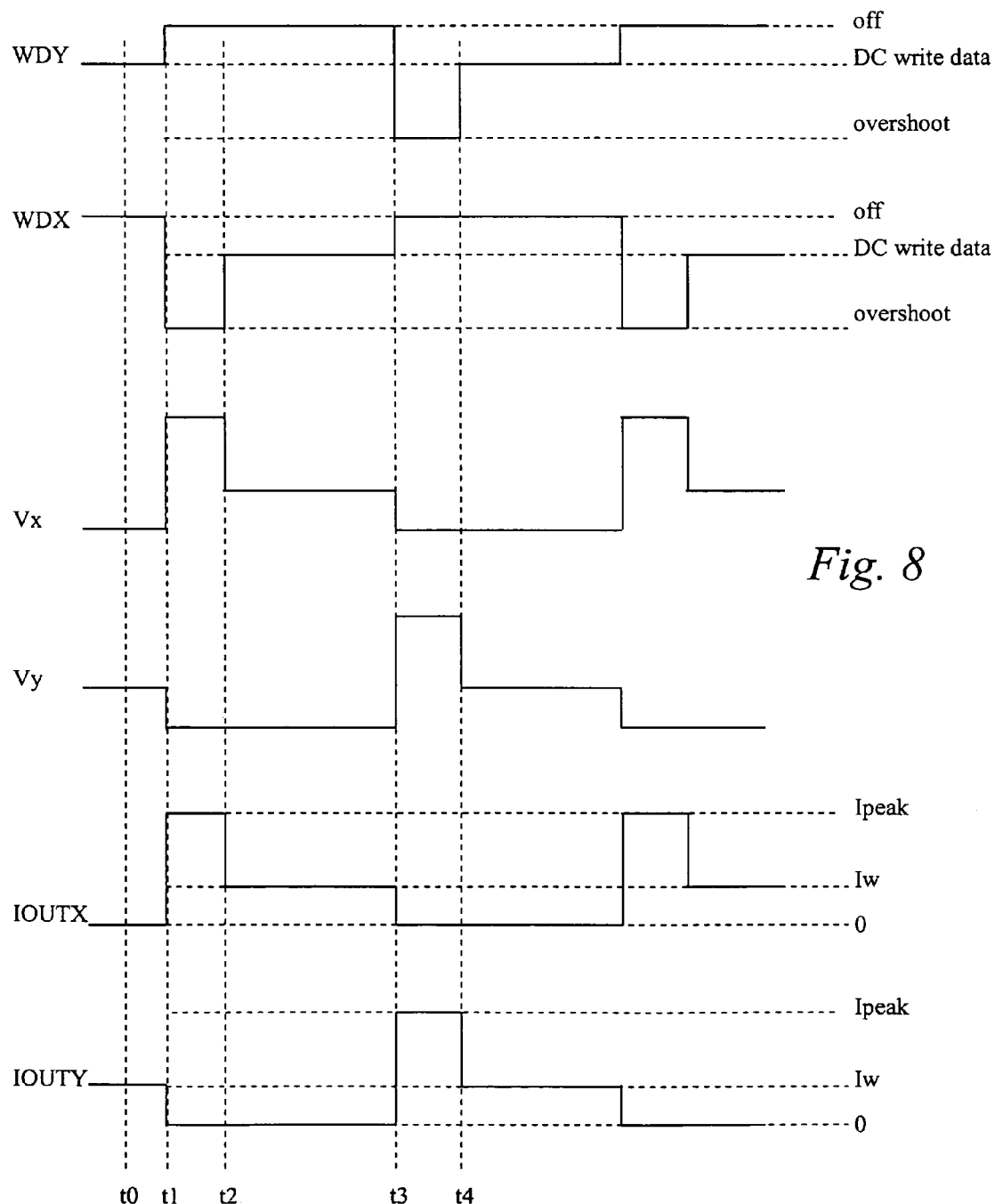
FIG. 8 illustrates a timing diagram showing signals in the trans-resistance circuit.

A trans-resistance block which solves the problems with the prior art is shown in FIGS. 7 and 8. FIG. 7 illustrates a schematic of the trans-resistance block and FIG. 8 illustrates a timing chart showing signals processed by the trans-resistance block of FIG. 7.

In FIG. 7, R12, Q12L, Q12R, Q10L, Q10R and R11 of the write driver from FIG. 4 are shown in phantom to aid in describing the operation of the circuit. Current source I313 is connected between Vcc and the emitters of PNP transistors Q37 and Q38. The base of Q37 is driven by WDX and the base of Q38 is driven by WDY. The collector of Q37 is coupled to the collector of Q12L, to a first terminal of resistor R31, and to the base of NPN transistor Q33. Current source I39 is coupled between the collector of Q37 and Vee. Current source I35 is coupled between Vcc and the opposite terminal of R31. The collector of Q38 is coupled to the collector of Q12R, to a first terminal of resistor R32, and to the base of NPN transistor Q34. Current source I311 is coupled between the collector of Q38 and Vee. The second terminal of R32 is coupled to the second terminal of R31. The emitters of Q33 and Q34 are coupled to the bases of Q10R and Q10L, respectively. Nodes Vx and Vy are the nodes at these bases. The collectors of Q33 and Q34 are coupled to ground.

Current source I31 is coupled between Vx and Vee. Current source I32 is coupled between Vy and Vee. NPN transistors Q35 and Q36 are coupled in series between the second terminal of R31 and Vee. The base of each transistor Q35 and Q36 is coupled to its collector.

As shown in FIG. 7, a degenerated bipolar differential pair (WDX, WDY) is used to drive the trans-resistance block, although pulse currents could be used in another implementation (so long as the input data currents are synchronized to turn on and off at the same time as the bias current I313 is switched). Emitter followers Q33 and Q34 and current sources I31 and I32 (or, alternatively, resistors) are added to drive the output devices Q10R and Q10L (any type of driver or buffer could be used in place of the emitter follower configuration, such as a class AB driver). A similar structure has been used in the prior art, but was not shown in FIG. 5 for simplicity. The bipolar devices Q35 and Q36 have been put in a common leg and thus always remain biased up at the full settled value (after overshoot pulse, as shown at t0 in FIG. 8).

Q35 and Q36 are sized to match Q33 and Q10R (and Q34 and Q10L). Similarly, R31 and R32 match R11. The ratio between these matched devices can be set to achieve various desired current gains. Lastly, and most importantly, is the addition of the four bias currents I35, I39, I311, and I313. All four are the same value ($I_{constant}$) and they are always on without any pulsing. The value of these bias currents is determined by the resistance of R31, R32 and the amount of voltage swing desired for the output bipolar differential pair Q10R, Q10L. For example, with R31=R32=20 ohms and a desired swing of 150 mVdiff, $I_{constant}$=3.75 mA. This value is bounded in one direction to ensure that the off output device does not conduct appreciable current and in the other direction by the desire to keep the voltage swing as small as possible for faster switching.

These bias currents quickly charge and discharge the parasitic capacitance at the critical nodes Vx and Vy. This fast slewing enables a fast turn-on and turn-off time of the current amplifier and allows operation at high data rates.

Referring to FIGS. 7 and 8, the operation of the circuit is as follows. At time=t0, the write data WDY is low and WDX is high. Thus, the bias current I313 and the data current (ratio of the write current Iw) from R12 flow through Q38 and Q12R respectively into node Vy. The $I_{constant}$ from I313 satisfies (flows into) I311. Since WDX is higher than WDY, no current flows through Q37 and Q12L. Thus the $I_{constant}$ from I39 is supplied by I35. This flow of $I_{constant}$ from I35 to I39 across R31 drops the voltage at node Vx down by $I_{constant}$*R31 lower than Vy. This voltage difference between Vx and Vy is transferred to the bases of Q10R and Q10L and ensures that Q10R does not conduct appreciable current at all values of data current (IOUTX=0 at t0). The voltage difference between Vx and Vy will be even larger than this due to the data current from R12 placed across R32. This data generated voltage across R32 is placed across R11 to create the output current IOUTY (IOUTY=Iw at t0).

At time=t1, the input data voltages WDX and WDY switch polarity. WDY goes high and WDX goes low. The input data voltages are conditioned to have three states: high (off), pulse low (overshoot), settled low or midstate (DC write data). The bias current $I_{constant}$ from I313 now flows through Q37 and satisfies (flows into) I39. Also, the data current through R12, which is now a large overshoot current, flows through Q12L and into R31. These currents quickly charge up node Vx providing a fast turn-on time for IOUTX. With no current flowing through Q38 or Q12R and I39 satisfied, the bias current I35 now flows through R32 and into I311. This current quickly discharges node Vy providing a fast turn-off time for IOUTY.

At time=t2, the overshoot pulse on WDX ends and enters the dc write data phase. The only change here is the magnitude of the voltages and currents along the on path (i.e., on Vx and IOUTX). The polarity of the input voltage data remains the same (WDY high, WDX low) and IOUTY remains off.

At time=t3, the input data voltages switch polarity again, with WDY going low and WDX going high. The bias current from I313 flows through Q38 into I311. The data current from R12, which is a large overshoot current, flows through Q12R and into R32. These currents quickly charge up node Vy providing a fast turn-on time for IOUTY. With no current flowing through Q37 or Q12L and I311 satisfied, the bias current I35 now flows through R31 and into I39. This current quickly discharges node Vx providing a fast turn-off time for IOUTX.

At time=t4, the overshoot pulse on WDY ends and enters the dc write data phase. The only change here is the magnitude of the voltages and currents along the on path (i.e., on Vy and IOUTY). The polarity of the input voltage data remains the same (WDY low, WDX high) and IOUTX remains off. This puts the circuit back into the initial state described for time=t0.

The trans-resistance circuit of FIG. 7 provides significant advantages over the prior art. The dc currents sources, which are always on, quickly discharge capacitive nodes for fast switching. Accordingly, switching can occur at a much faster rate.

Figure 9:
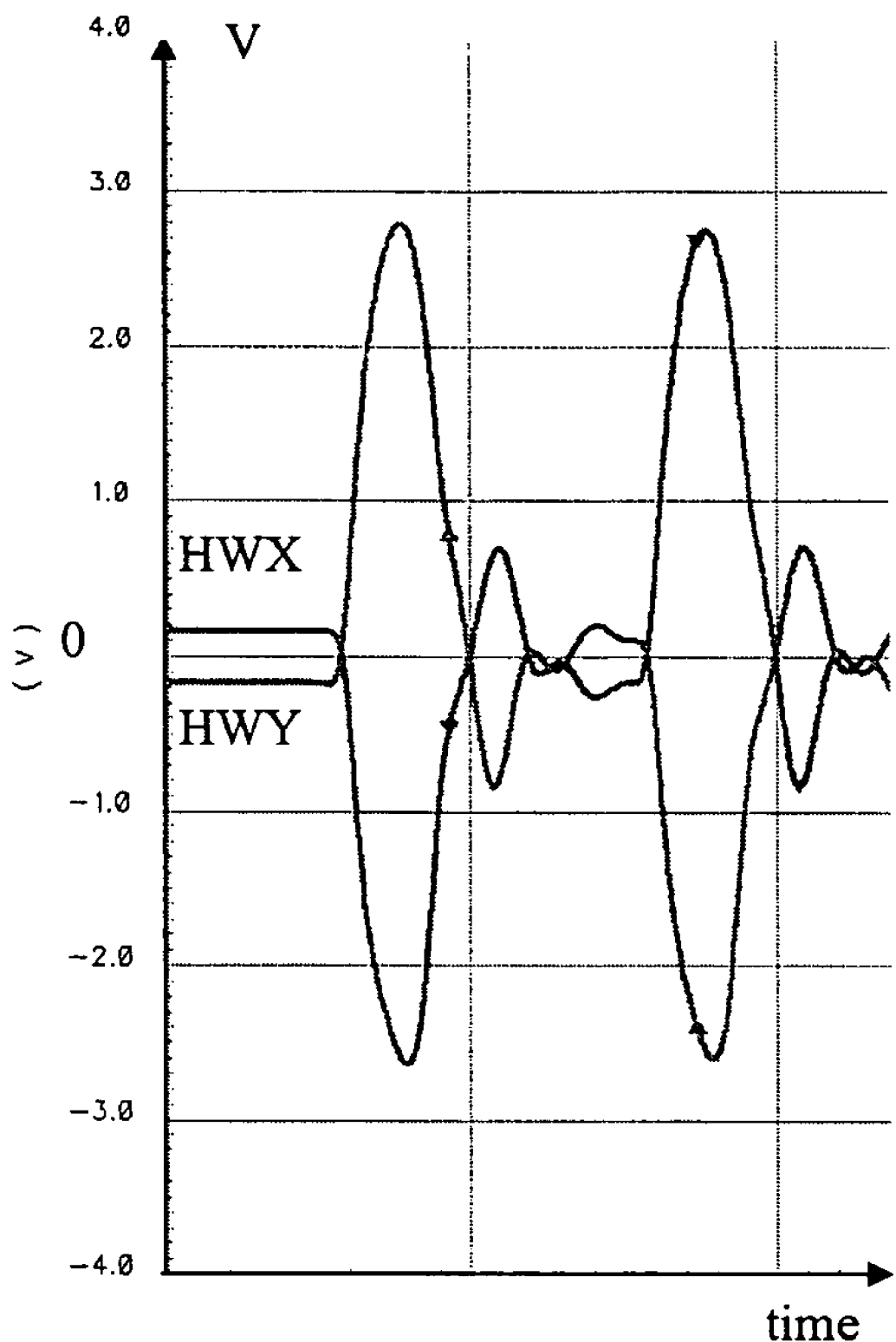
FIG. 9 illustrates voltages produced by the improved write driver of FIG. 4.
Figure 10:
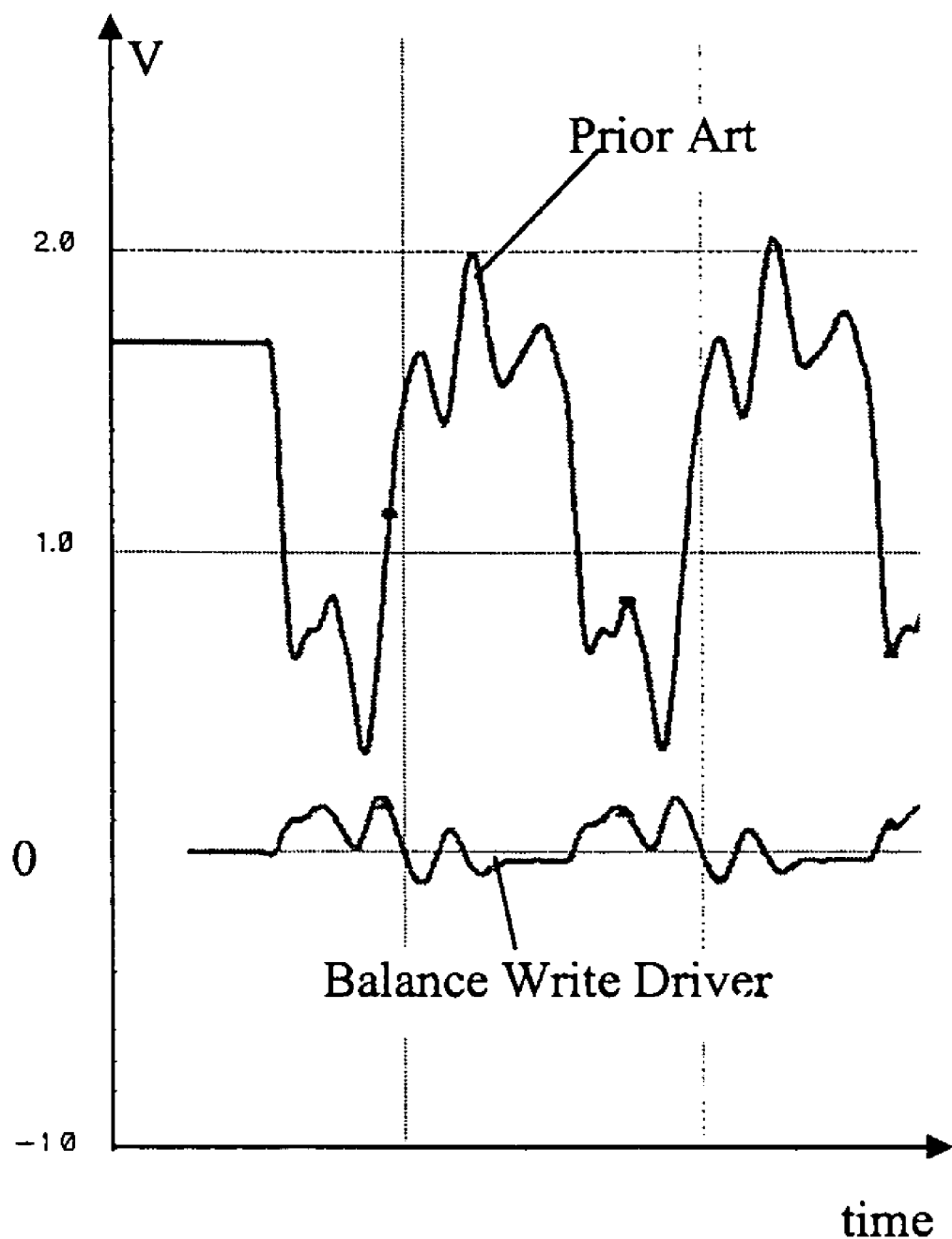
FIG. 10 illustrates common-mode voltages for the write drivers of FIG. 2 and FIG. 4.

FIG. 9 illustrates a chart showing the voltages at HWX and HWY during switching. As can be seen, the voltages are very symmetrical. FIG. 10 illustrates the common mode voltages across the head 32 for the prior art write driver and for the balanced write driver of FIG. 4. As can be seen, the balanced write driver virtually eliminates damaging common mode voltage transients.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

The invention claimed is:

1. A trans-resistance circuit for rapidly enabling one of a pair of transistors of a write driver and disabling the other of the pair of transistors of the write driver responsive to a data signal, comprising:
   circuitry for charging a first node responsive to a first state of the data signal and actively discharging the first node responsive to a second data signal; and
   circuitry for charging a second node responsive to the second state of the data signal and actively discharging the second node responsive to the first data signal.
wherein said circuitry for charging the first node comprises:
   a first current source;
   a second current source coupled to the first node;
   a third current source;
   a fourth current source coupled between the second node, where each current source supplies the same amount of current;
   a first transistor for selectively providing a path between the first current source and the first node, responsive to the data signal;
   a first resistor coupled between the third current source and the first node;
   a second transistor for selectively providing a path between the second node, responsive to the data signal, such that the data signal enables one of the first and second transistors and disables the other of said first and second transistors; and
   a second resistor coupled between the third current source and the second node, such that current is drawn through said first resistor when said first transistor is disabled and the second transistor is enabled, thereby charging the first node, and current is drawn through the second resistor when said first transistor is enabled and the second transistor is disabled ,thereby charging the second node.

2. The trans-resistance circuit of claim 1 wherein said first node drives a third transistor and the second node drives a fourth resistor.

3. The trans-resistance block of claim 2 wherein the third transistor drives said one of the pair of transistors of the write driver and the fourth transistor drives the other of the pair of transistors of the write driver.

* * * * *